Figure 1:
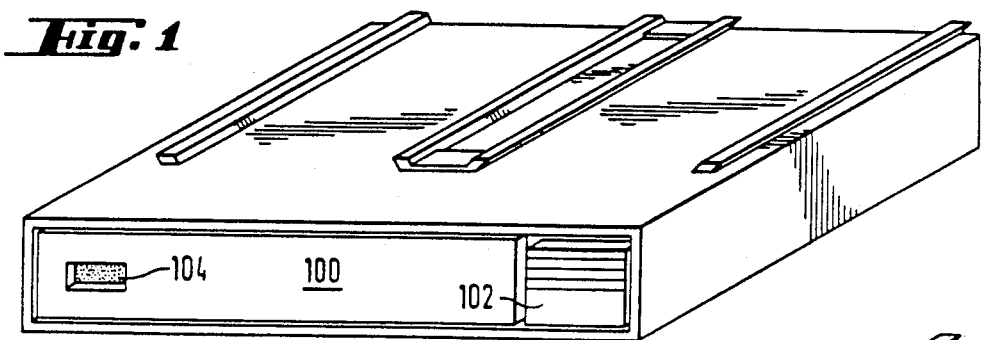

United States Patent [19]

Bohnet et al.

[11] Patent Number: 4,743,077
[45] Date of Patent: May 10, 1988

[54] MAGNETIC TAPE CASSETTE BOX

[75] Inventors: Klaus Bohnet, Waldachtal, Fed. Rep. of Germany; Peter Ackeret, Kusnacht, Switzerland

[73] Assignee: IDN Inventions and Development of Novelties AG, Switzerland

[21] Appl. No.: 932,680

[22] Filed: Nov. 20, 1986

Related U.S. Application Data

[60] Division of Ser. No. 866,265, May 23, 1986, which is a division of Ser. No. 729,904, May 3, 1985, Pat. No. 4,592,600, which is a continuation of Ser. No. 488,022, Apr. 25, 1983, abandoned.

[30] Foreign Application Priority Data

Apr. 28, 1983 [DE] Fed. Rep. of Germany ....... 3215721

[51] Int. Cl.$^4$ .............................................. A47B 81/06
[52] U.S. Cl. ..................... 312/12; 206/387; 312/234.3
[58] Field of Search ...................... 312/9–12, 312/15, 18, 330, 234, 234.3, 111; 206/459, 387; 116/200

[56] References Cited

U.S. PATENT DOCUMENTS

| | | | |
|---|---|---|---|
| 2,169,743 | 8/1939 | Schlage | 292/145 |
| 3,110,215 | 11/1963 | Jenkins et al. | 116/200 |
| 3,275,158 | 9/1966 | Glass et al. | 211/40 |
| 3,469,760 | 9/1969 | Rausing et al. | 229/14 |
| 3,603,478 | 9/1971 | Connan | 221/87 |
| 3,854,885 | 12/1974 | Fromm et al. | 23/254 |
| 4,243,279 | 1/1981 | Ackeret | 312/107 |
| 4,257,524 | 3/1981 | Yonkers et al. | 211/71 |
| 4,399,913 | 8/1983 | Gelardi et al. | 312/10 X |
| 4,592,600 | 6/1986 | Bohnet et al. | 312/12 |

FOREIGN PATENT DOCUMENTS

| | | |
|---|---|---|
| 2228533 | 2/1973 | Fed. Rep. of Germany . |
| 2248408 | 1/1974 | Fed. Rep. of Germany . |
| 3015749 | 10/1981 | Fed. Rep. of Germany . |
| 3034369 | 3/1982 | Fed. Rep. of Germany . |
| 2457094 | 12/1980 | France . |
| 1475988 | 6/1977 | United Kingdom . |

Primary Examiner—Joseph Falk
Attorney, Agent, or Firm—Vorys, Sater, Seymour & Pease

[57] ABSTRACT

A magnetic tape cassette box with an indicator device which shows whether or not the box contains a cassette. The indication is provided visibly and/or palpably in that region of the box which is always accessible for the insertion or removal of a cassette.

33 Claims, 15 Drawing Sheets

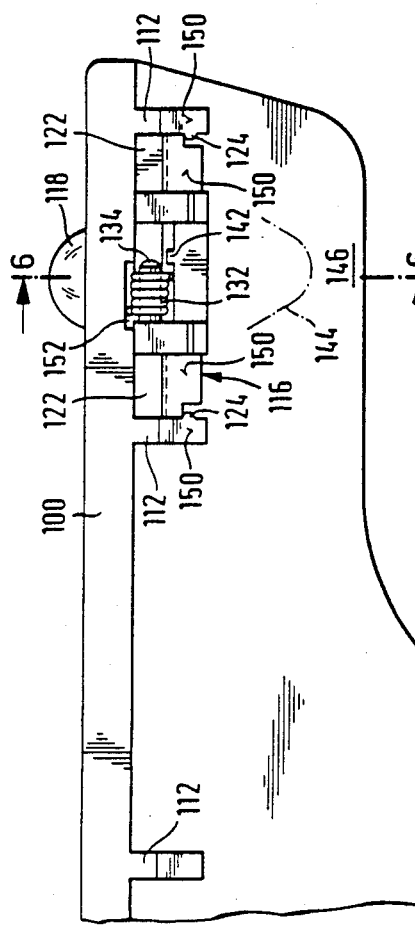
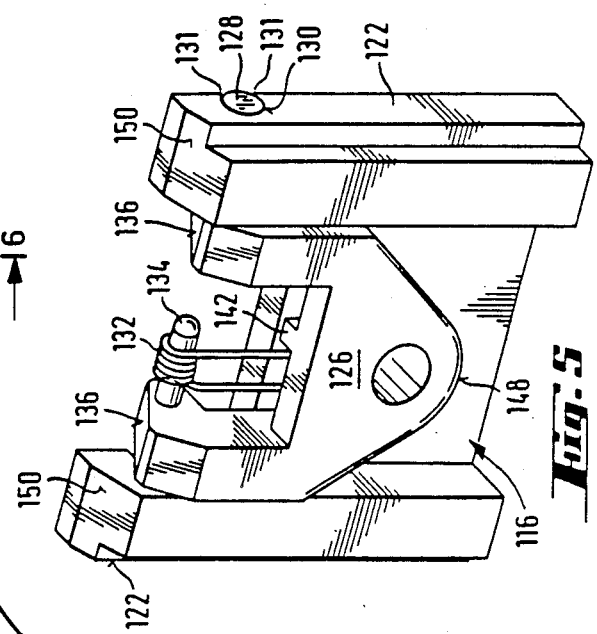
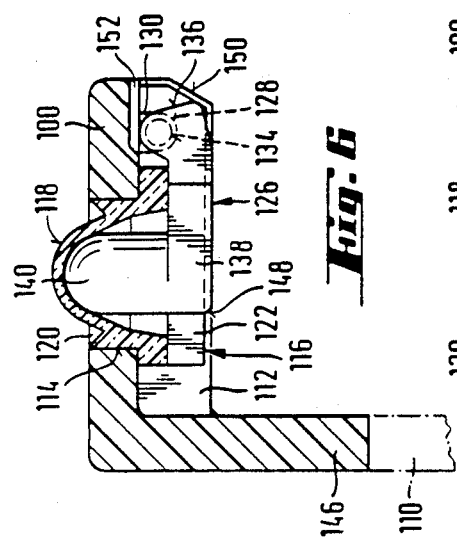
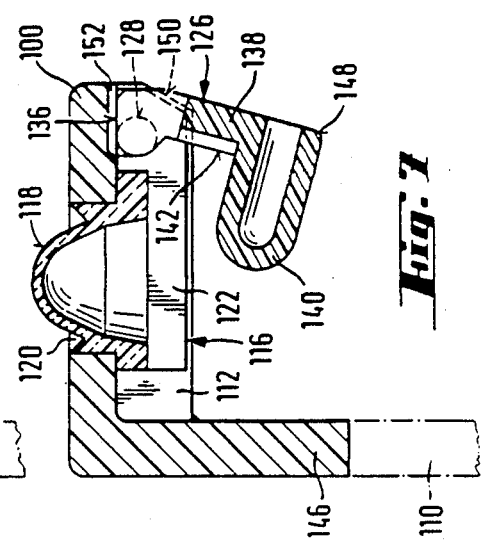

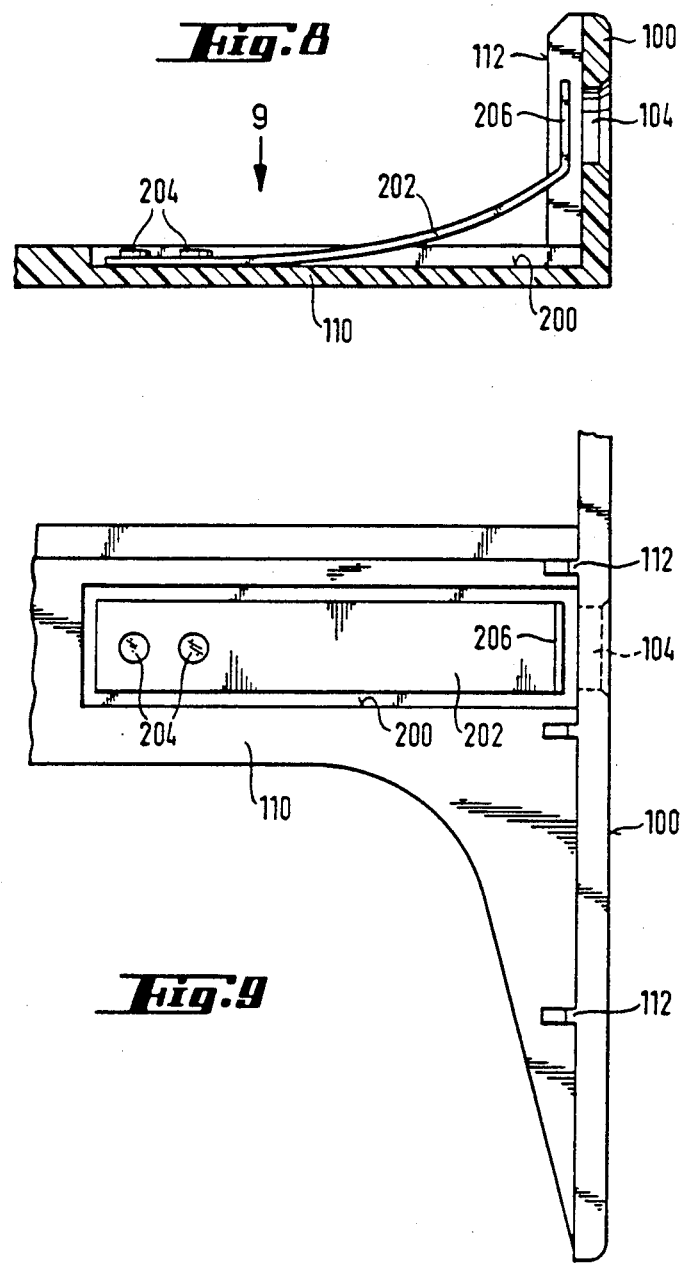

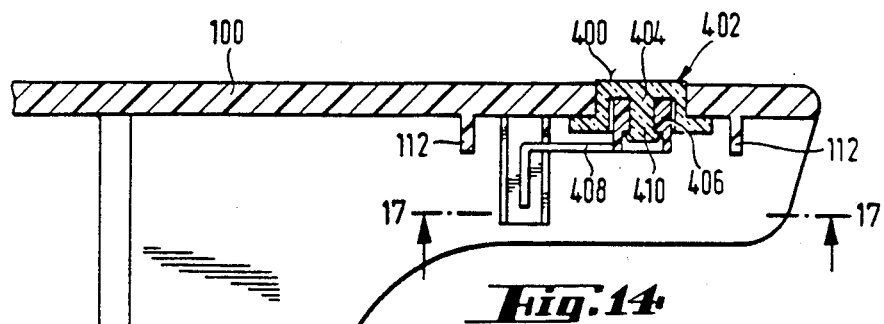
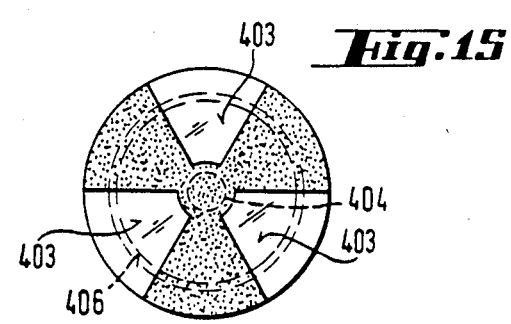
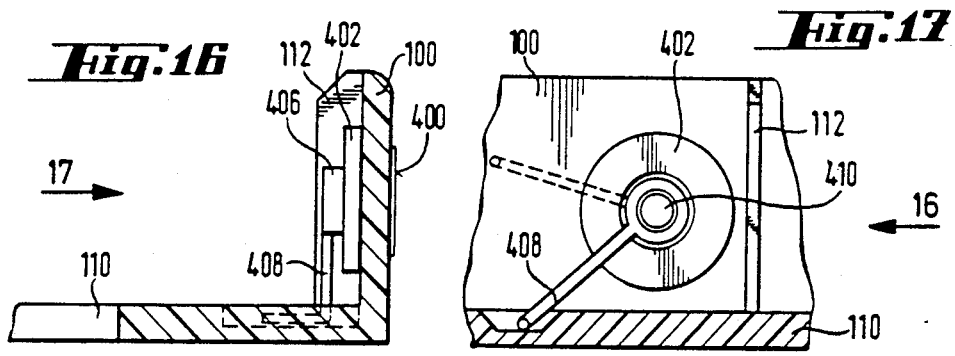
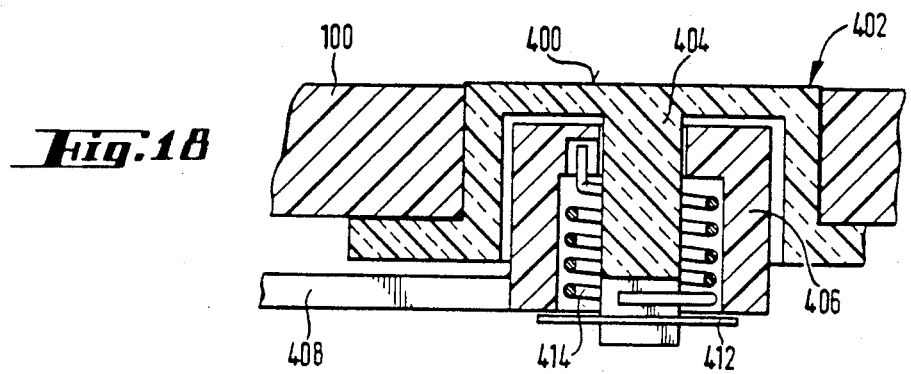

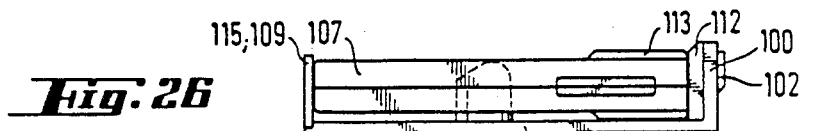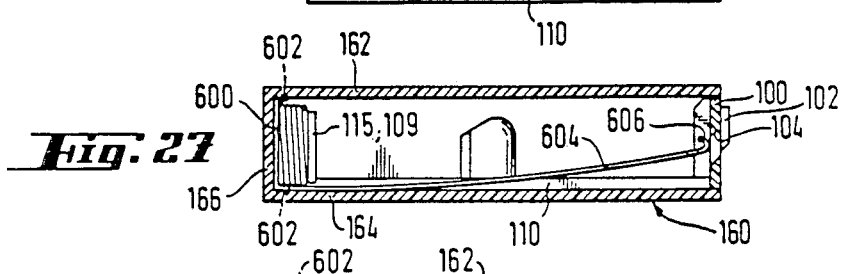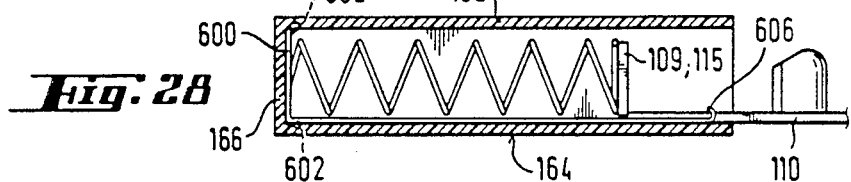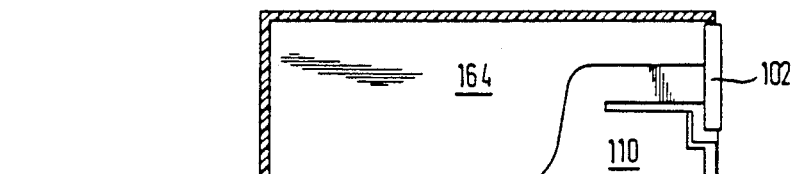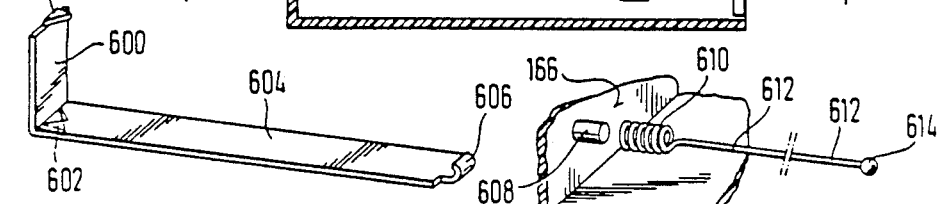

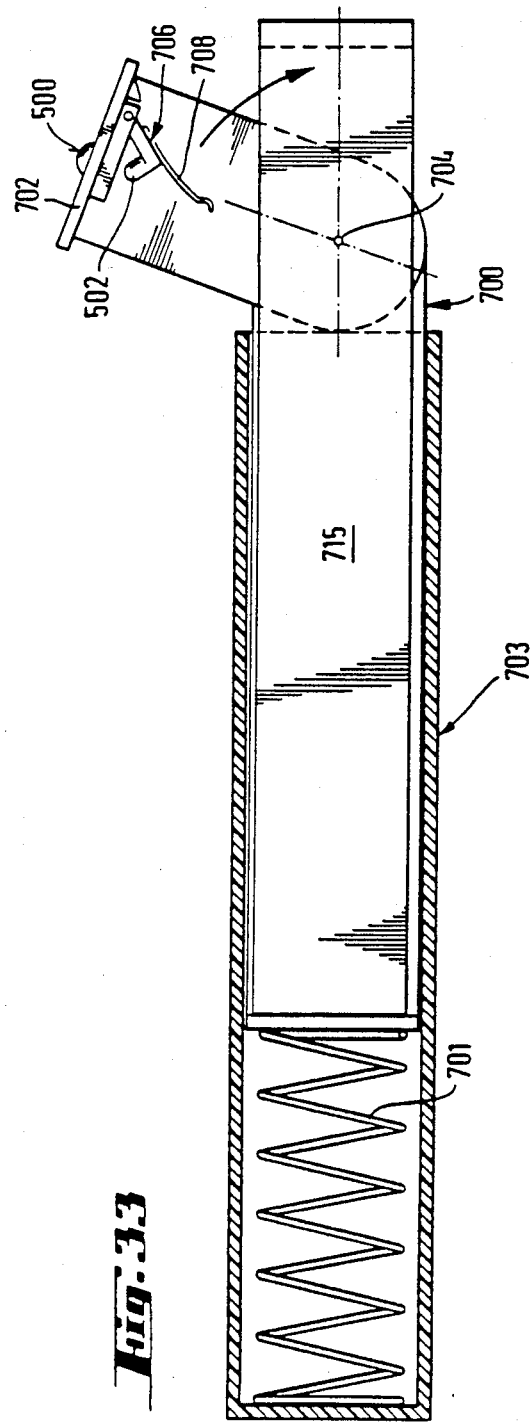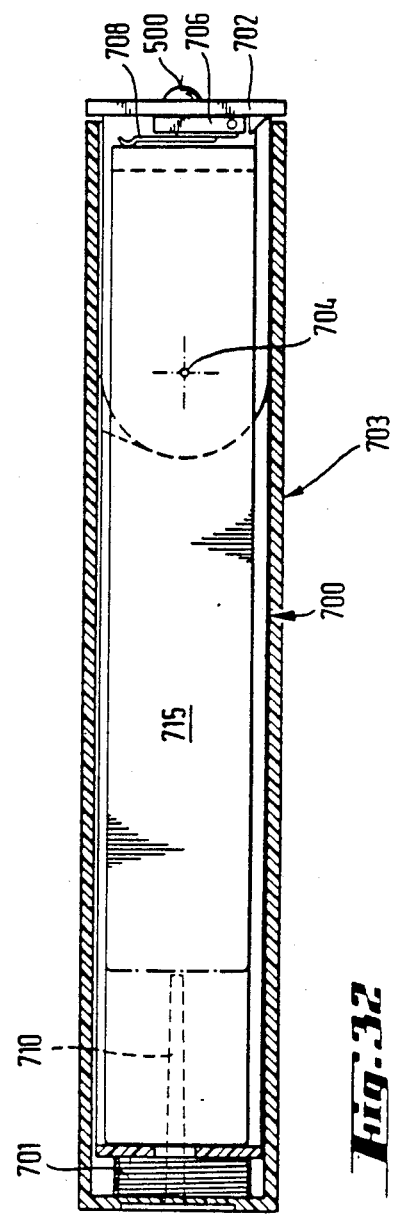

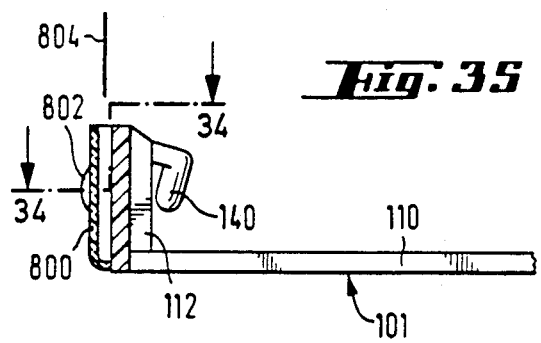
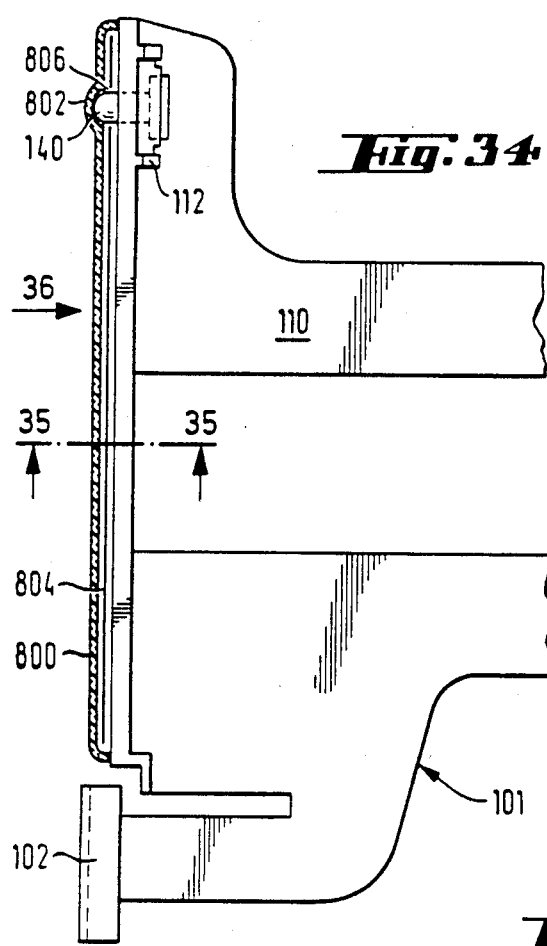
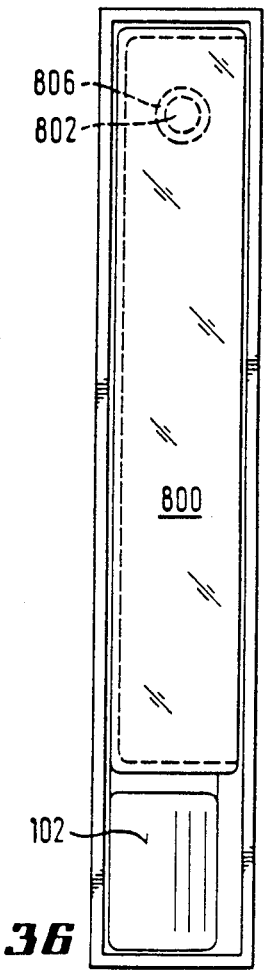

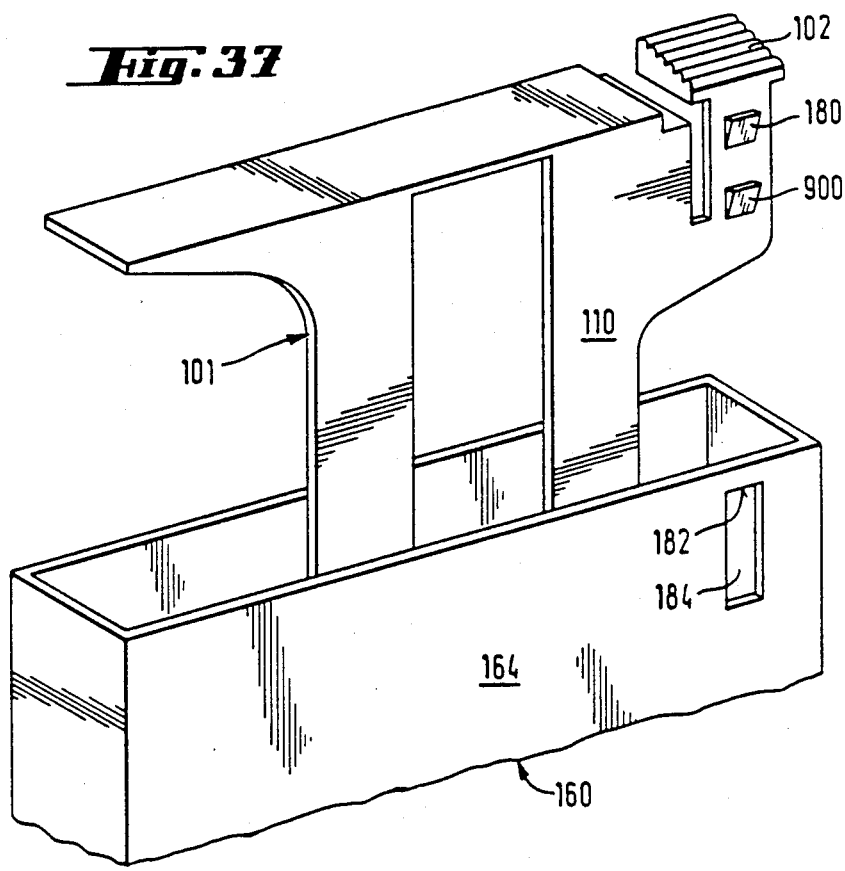
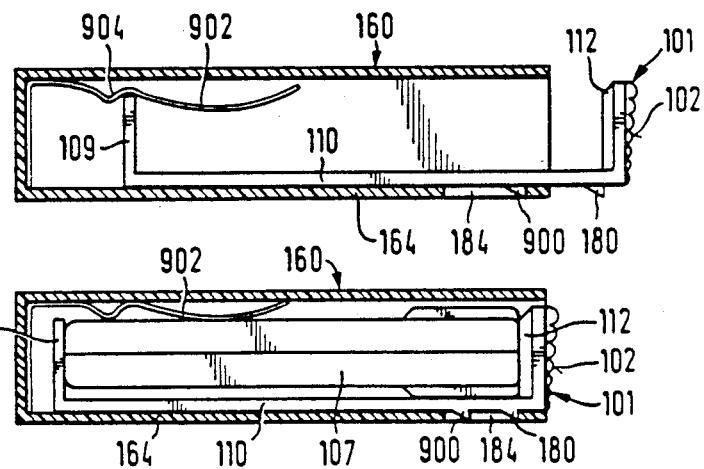

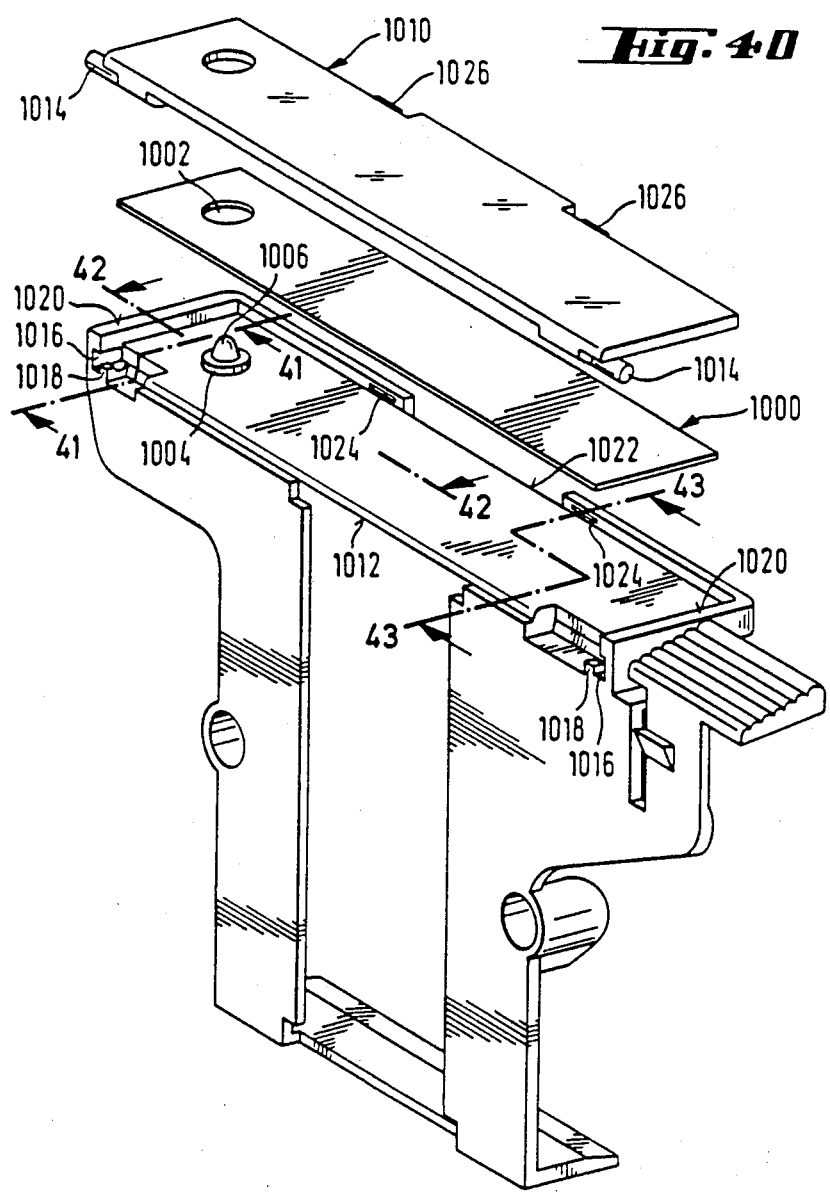

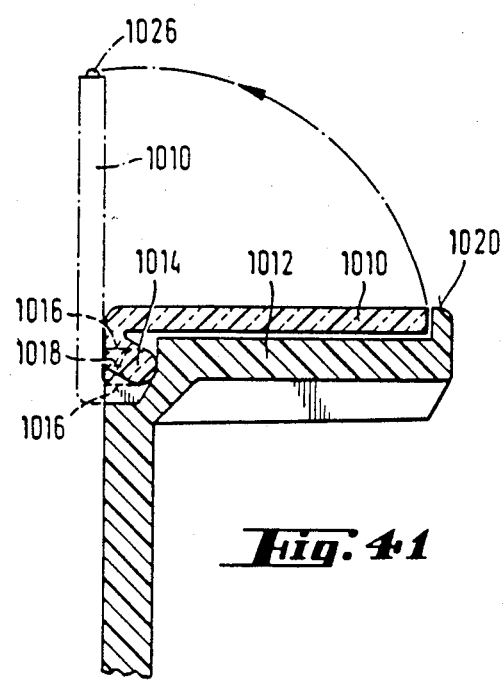
Fig. 4.1
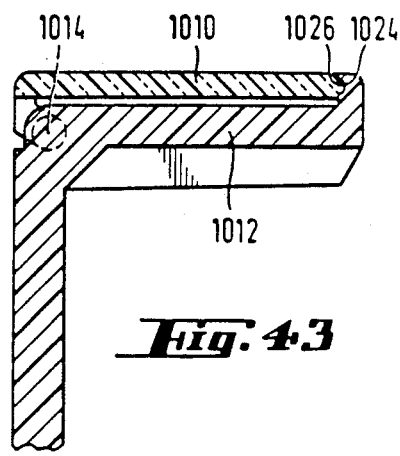
Fig. 4.3
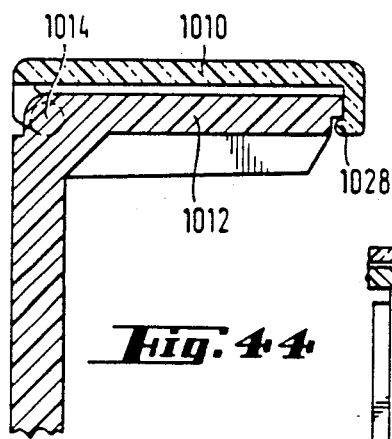
Fig. 4.4
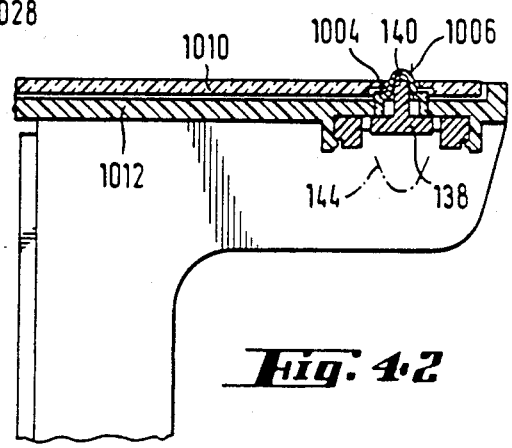
Fig. 4.2

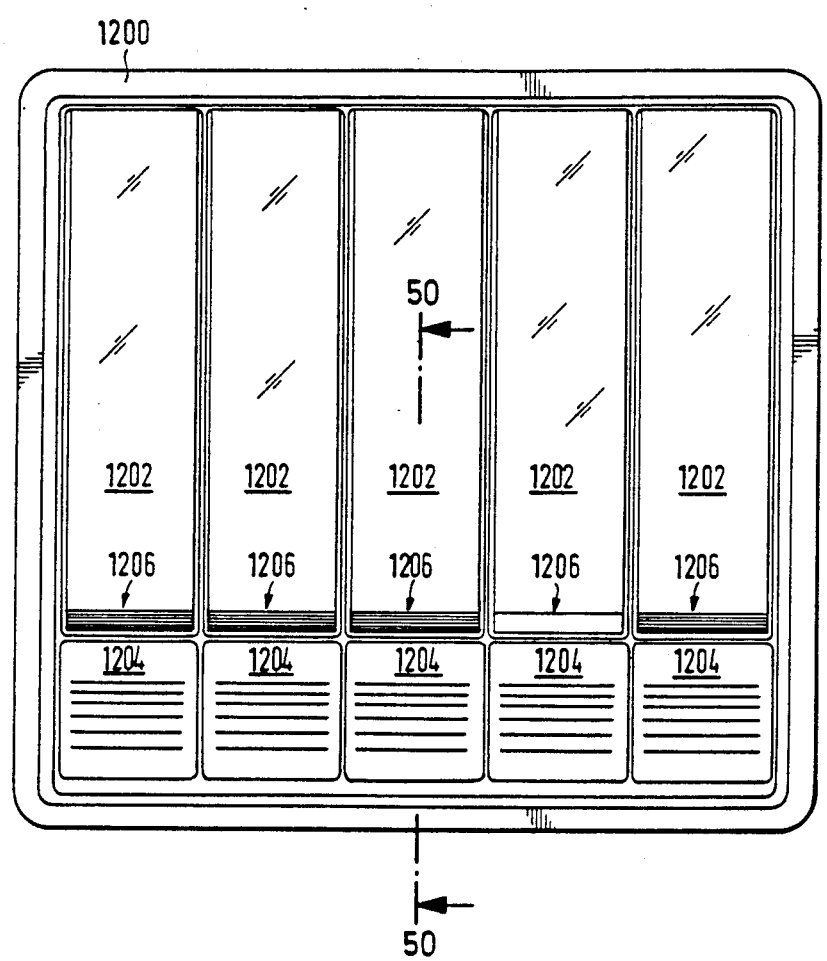

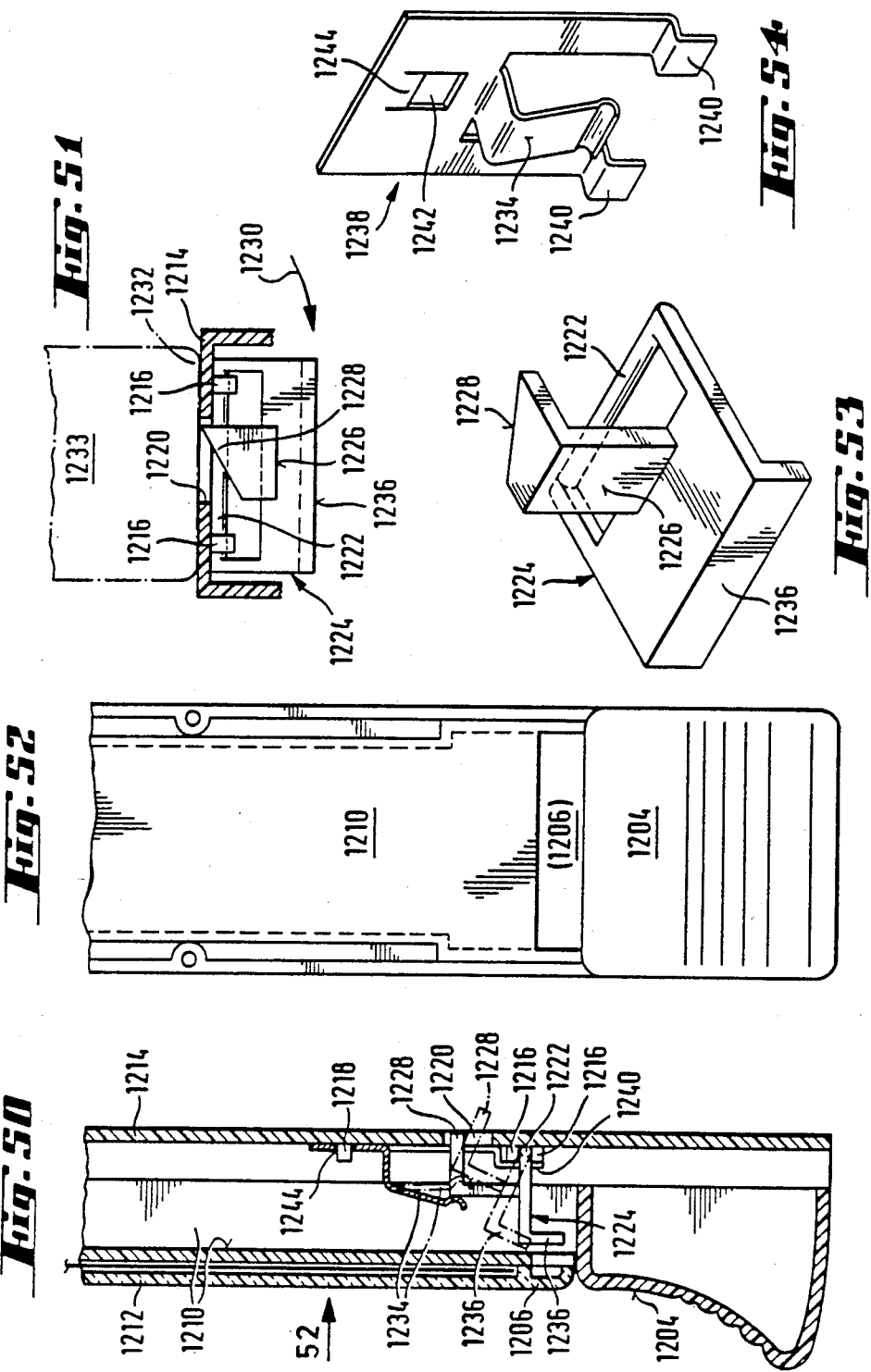

MAGNETIC TAPE CASSETTE BOX

This is a divisional of co-pending application Ser. No. 866,265 filed on May 23, 1986 which is a divisional of application Ser. No. 729,904 filed on May 3, 1985 which is now U.S. Pat. No. 4,592,600, which issued June 3, 1986, which is a continuation of application Ser. No. 488,022 filed on Apr. 25, 1983 now abandoned.

The invention relates to a magnetic tape cassette box with the features mentioned in the precharacterizing clause of patent claim 1.

Such boxes for so-called compact cassettes are available commercially under the designation "cbox" and described and illustrated in German Pat. No. 2,248,408; boxes for video cassettes form the subject of German patent application P 32 01 486.4.

As a general rule the user possesses a fairly large number of cassettes accommodated in boxes. When a cassette is taken out and the box is reclosed, it is not immediately possible to tell which box has been emptied; it is necessary for the user to discover the empty box in which the cassette belongs by comparison of the inscriptions on cassettes and boxes. If there is no inscription on the boxes, then the search must be continued until an empty box is found.

The aim of the invention is to further develop boxes of the type initially mentioned so that empty boxes are externally distinguishable from full ones.

The solution provided according to the invention will appear from the characterizing clause of patent claim 1.

According to this, the user can see (or feel) from the closed box whether or not it contains a cassette. Palpability is desirable in the case of use in the dark, for example in a motor vehicle.

Where reference is made below to the known cbox box, it is to be understood that the principle of construction of the indicator device is also applicable to different types of boxes for cassettes; this is also concretized in detail for one specific preferred embodiment, but it also applies to the other embodiments, whilst the structural adaptations can easily be performed by the expert.

It may be provided that the indicator device is provided in the surface region of the front wall.

In this case a blocking element may be provided as intermediate stop for the movable front wall, which blocking element is movable into an unblocking position by the insertion of a cassette.

It may be provided that the indicator element is pivotally movable.

It may be provided that the indicator element is slidable.

It may be provided that an indicator subassembly comprizing the indicator element is arranged on the housing.

It may be provided that the subassembly comprizes a bearing element which can be snapped in on the drawer and in which the indicator element is mounted pivotably.

It may be provided that the indicator element is injection molded from a plastic material mixed with phosphorescent pigment.

It may be provided that a transparent mask is provided in the perforation.

It may be provided that the mask is of lenticular construction.

It may be provided that the mask is injection molded integrally with the bearing element from transparent plastic.

It may be provided that the indicator element comprizes a head, the contour of which is constructed complementary to the internal contour of the lens.

It may be provided that the head is located in abutment with the internal surface of the lens when the cassette is inserted.

It may be provided that the lens projects beyond the drawer front wall.

It may be provided that the subassembly comprizing the bearing element, the indicator element and the spring can be snapped preassembled into the drawer.

It may be provided that the subassembly is arranged on the inside of the drawer front wall.

It may be provided that the indicator subassembly is arranged between the fins.

It may be provided that a lever arm of the indicator element, which is actuable by an inserted cassette, is substantially flush with the guide fin edges confronting the cassette.

In this case a cushion of foam plastic may be provided.

It may be provided that the label window itself forms the transparent mask and is lenticular in the region of the perforation.

It may be provided that the label window exhibits a non-reflective finish outside the lenticular region.

It may be provided that the label exhibits a cutout aligning with the perforation.

It may be provided that the drawer exhibits surface regions protecting the indicator arrangement.

Figure 2:
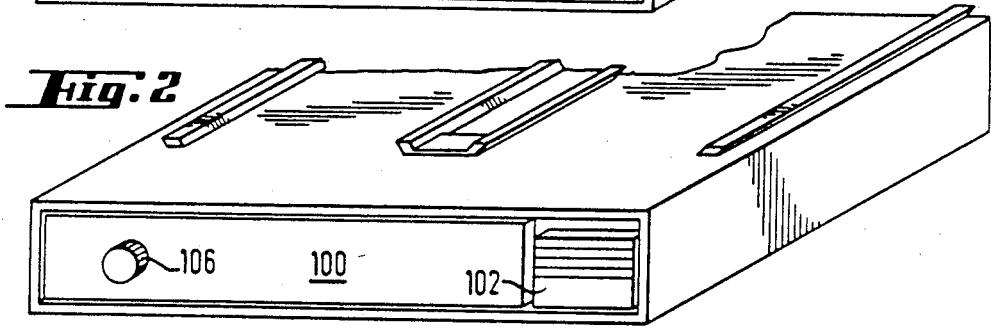
Figure 3:
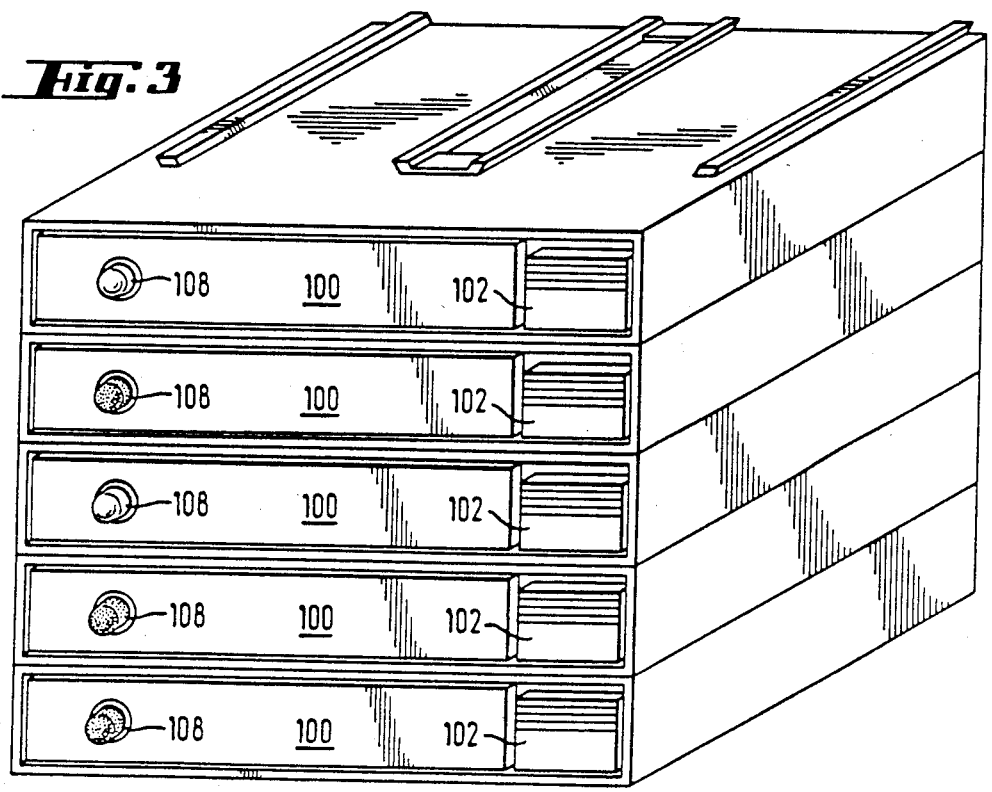
Figure 10:
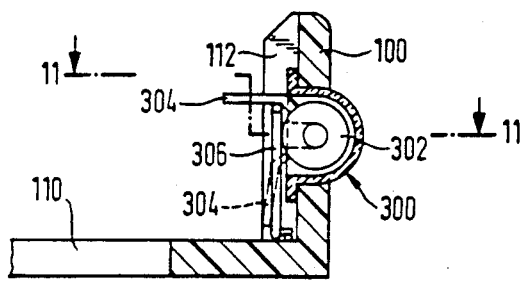
Figure 12:
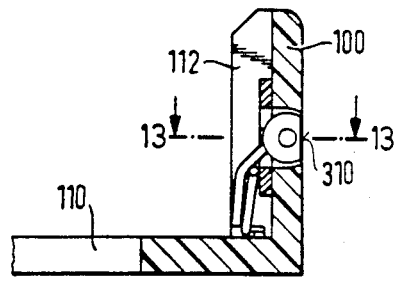
Figure 11:
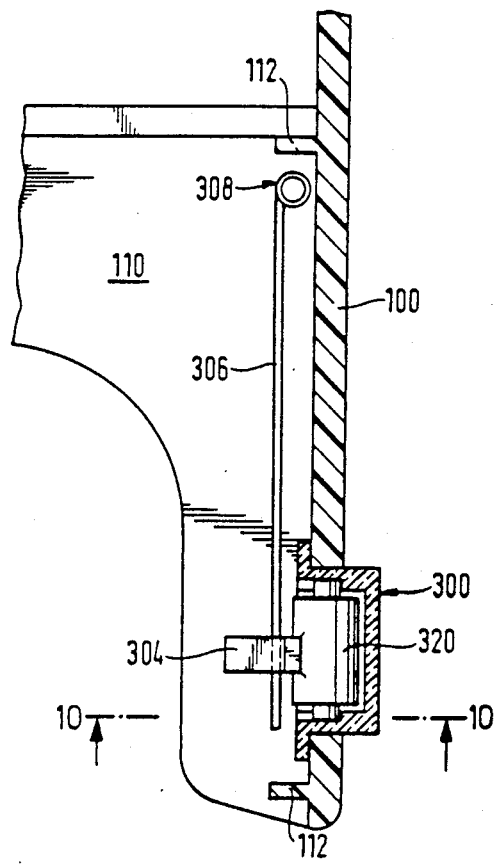
Figure 13:
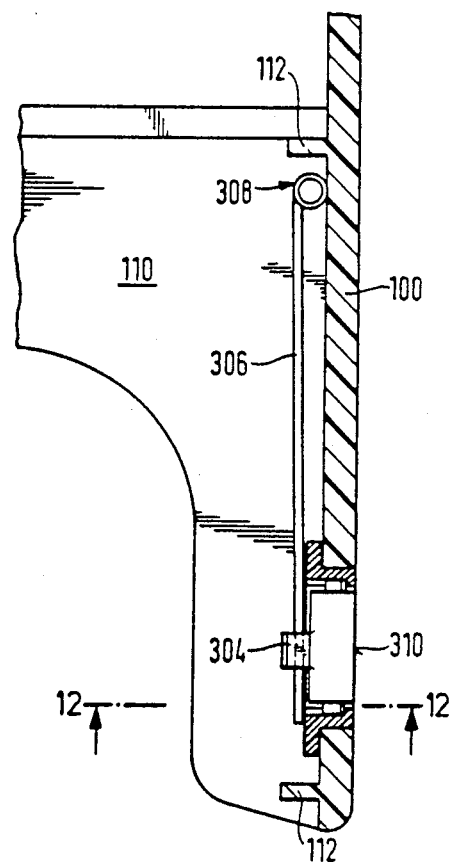
Figure 19:
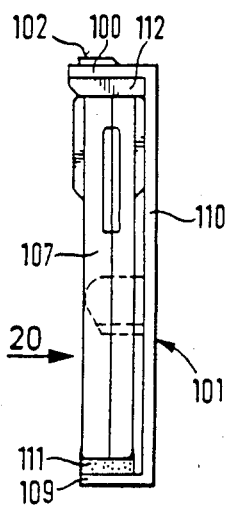
Figure 20:
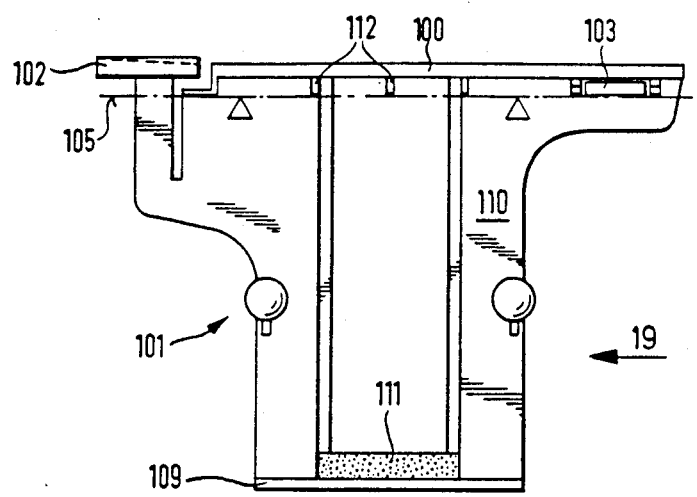
Figure 21:
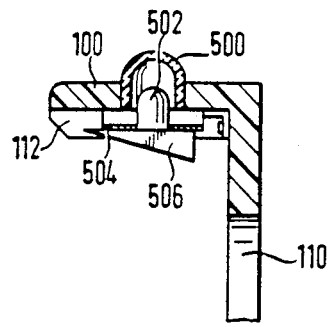
Figure 22:
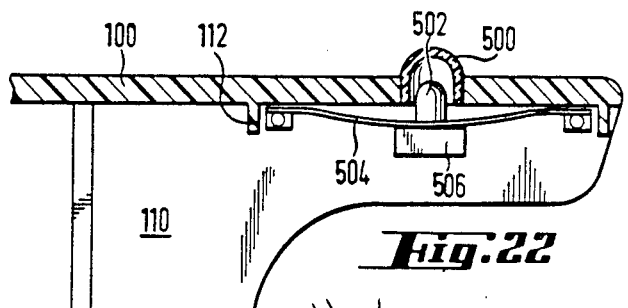
Figure 23:
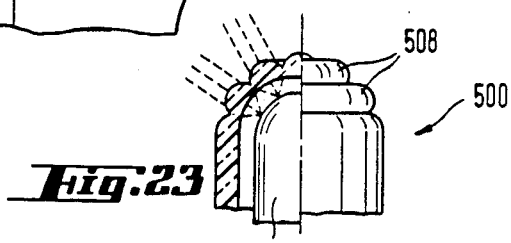
Figure 24:
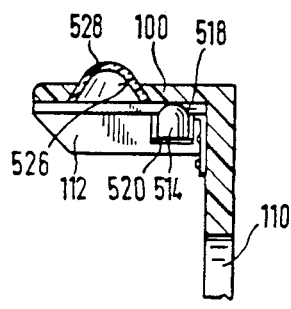
Figure 25:
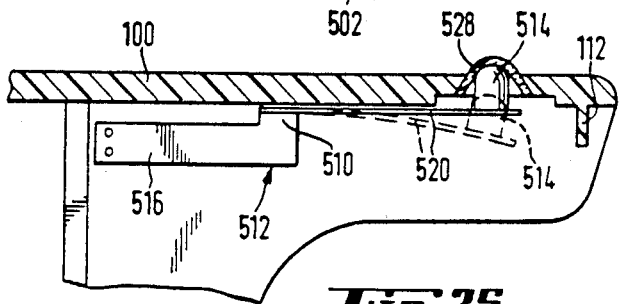

Exemplary embodiments of the object of the invention are explained in detail below with reference to the accompanying drawings, wherein:

FIG. 1 shows in perspective a cassette box with an optical indicator device according to the invention, FIG. 2 shows, analogously to FIG. 1, an embodiment with an optico-tactile indicator device, FIG. 3 shows a further embodiment of an optical indicator device in the case of boxes stacked to form a block, FIGS. 4 to 7 show the embodiment according to FIG. 3 in detail, FIGS. 8 and 9 show details of the embodiment according to FIG. 1, FIGS. 10 and 11 show a variant of the embodiment according to FIG. 3, FIGS. 12 and 13 show in detail an embodiment similar to FIG. 2, derived from the construction according to FIGS. 10 and 11, FIGS. 14 to 17 show a further embodiment of an optical indicator device, FIG. 18 shows a variant of the construction according to FIGS. 14 to 17, FIGS. 19 and 20 show details of the cassette box which are material to the function of the indicator device, FIGS. 21 to 23 show a further embodiment of an optical indicator device, FIGS. 24 and 25 show a variant of the last-mentioned embodiment, FIGS. 26 to 30 show an embodiment of the indicator device which is mounted in the stationary part of the box, FIG. 31 shows a variant of the previous embodiment, FIGS. 32 and 33 illustrate the arrangement of the indicator device on a box for video cassettes, FIGS. 34 to 36 show a further variant of the box according to FIGS. 4 to 7, FIGS. 37 to 39 show a further possible embodiment of a cassette box with indicator device, FIGS. 40 to 44 show an embodiment of yet different configuration from FIGS. 4 to 7, FIGS. 45 to 48 show an embodiment of a box for video cassettes according to the invention, and FIGS. 49 to 54 show a further video cassette box according to the invention.

All the embodiments illustrated—except for FIGS. 32/33 and FIGS. 45 to 54—show indicator devices on cbox-type boxes. Boxes of this type have an external housing with stacking bars and stacking grooves in order to form blocks from a plurality of boxes (FIG. 3), and each external housing contains a transport drawer subject to spring pretension, the front wall of which is always accessible to the user, because the box is opened by actuating a key provided in the drawer front wall region. The drawer is then protruded by a spring into a position in which the cassette can be inserted or removed.

On the basis of the construction just described it is preferred to make the indicator device visible and/or palpable in the region of the drawer front wall.

FIG. 1 shows schematically an optical indicator device. The drawer front wall 100 contains, near the end remote from the trigger key 102, a perforation 104, behind which a signal flag or the like, which is pushed away by an inserted cassette, becomes visible after the removal of the cassette.

According to FIG. 2, the cassette being removed, a head 106 projects beyond the front wall 100 of the drawer, and is returned when the cassette is inserted so that its end face lies flush with the external surface of the drawer front wall. In this case the signal is both visible and palpable.

In FIG. 3 the drawer front walls are provided with lenticular windows 108, behind which a signal appears when a cassette is inserted.

FIGS. 4 to 7 illustrate the last embodiment in detail. FIG. 4 shows a plan of the relevant front end of the drawer with front wall 100 and drawer base plate 110; internal front wall fins 112, which are shaped on the injection-molded plastic drawer, are abutted by the tape level edge of an inserted cassette. The front wall 100 also exhibits a cylindrical perforation 114. A shutter 116 of transparent plastic which is pressed into the perforation 114 projects with a dome 118—somewhat undercut at its foot circle 120 for aesthetic reasons—beyond the front wall 100 and abuts with its base plate 122 against the inside of the front wall; it is squeezed between fins 112 and retained by cams 124 on the fins, which spring apart when it is squeezed in.

A signal lever 126, which is articulated to the base plate, is preferably injection molded from a plastic pigmented with fluorescent material; such pigments are available from Messrs. Sterling Colour Company, London. The signal lever 126 is preassembled rotatably by journals 128 in bearing incisions 130 of the base plate 122, whilst lugs 131 prevent the arrangement from falling apart in the preassembled state—shown in perspective in FIG. 5. A necked leg spring 132 is mounted by its coil on a pin 134 coaxial with the journals 128; one of its legs is braced internally against the base plate, whilst the other pretensions the signal lever into the "empty indication position" illustrated in FIG. 7, which it assumes after removal of the cassette, whilst its stop edge 136 is braced against the drawer front wall. The lever arm 138 then stands obliquely at approximately 15° to the plane of the drawer base 110, so that the drawer can be safely slid into the housing (not shown in FIGS. 4 to 7). The lever arm 138 carries the signal head 140, which is pivoted into the position visible in FIG. 6 by inserting a cassette, and abuts against the interior surface of the dome 118 with its contour of complementary construction. The colored signal head is clearly detectable through the transparent dome even from a considerable distance. A web 142 formed on the lever arm 138 prevents the spring leg from slipping off.

The end contour 144 of the lever arm 138 is indicated by dashed lines in FIG. 4; it is clear that the user, when grasping an inserted cassette, is prevented by the region 146 of the drawer base plate from touching the signal lever roughly and thus damaging it. The rounding at 148 and the beveling at 150 prevent the cassette from becoming caught during removal or insertion, and an indentation 152 in the front wall 100 provides space for the spring coil of the spring 132.

The first detailed exemplary embodiment is explained above with all its details, as they are also illustrated in the drawings. For the following exemplary embodiments, on the other hand, substantially only the respective principle will be explained, whilst the structural details may be omitted because the expert can transfer them analogously from the above description; this also refers to necessary cavities, roundings etc.

FIGS. 8 and 9 show in partial longitudinal section and in partial plan respectively an embodiment according to FIG. 1. A leaf spring 202 is secured in a channel-like recess 200 in the drawer base plate 110, for example by melting down two integrally molded feet 204 after placing the spring provided with corresponding bores. The leaf spring is bent so that when the cassette is removed, an angled end piece 206 stands in front of a perforation 104 of the front wall 100 and is visible from the outside, the visible surface conveniently being colored. When the cassette is inserted the leaf spring becomes deformed towards the base plate 110, which does not obstruct the insertion of the cassette because the angled part 206 projects into the region near the front wall 100, into which the cassette cannot pass due to the fins 112.

In the embodiment according to FIGS. 10 and 11, a signal roller 302 with differently colored sectors is mounted rotatably in a transparent frame 300, fitted into a perforation of the front wall 100. When a cassette is inserted the wing 304 molded on the roller 302 is pivoted out of the position shown by solid lines in FIG. 10 into the dash-line position, so that a roller sector of different color becomes visible in the window formed by the frame 300; the roller is rotated back into the empty indication position by the free arm 306 of a wire spring 308. Only the wing 304 projects into the cassette accommodation region; all other parts are again protected behind the fins 112.

This indication is only detectable optically. If, as shown in FIGS. 12 and 13, the frame is left open towards the outside and the roller 302 is flattened sectorially, a signal can also be felt, as will immediately be clear from FIG. 12. The flattened part 310 is then given the same finish as the outside of the front wall 100, whereas the remaining cylindrical envelope is finished in a contrasting color.

In the embodiment according to FIGS. 14 to 17 the front plate 400 of a bearing eye 402 inserted into a front wall perforation is transparent only in 60°-sectors 403 mutually staggered at 120° (FIG. 15). A signal roller 406, the end face of which, visible through the transparent sectors 403, exhibits a congruent pattern to the latter, is mounted rotatably on a central journal 404. The roller 406 is pivotable through 60° upon insertion of the cassette when the cassette strikes the arm 408 attached to the roller. The return of the roller into the empty indication position occurs by means of a torsion spring acting between eye 402 and roller 406 (FIG. 18); the axial security of the roller on the journal 404 is effected by the welded cam 410. Instead of this, the security may also be effected by a washer 412, as shown in FIG. 18, which also illustrates the construction and arrangement of the spring 414.

FIGS. 19 and 20 show in side elevation and in plan respectively a complete drawer 101, on which any one of the previously described indicator devices—generally designated 103—is provided. The line 105 indicates the tape level front edge of an inserted cassette 107, which edge must always come into abutment against the bars 112 so that the respective actuating element of the indicator device, which must itself project by at least 0.1 mm into the accommodation region of the cassette in each case, is reliably moved by the cassette. But since the dimensions of the customary compact cassettes are subject to tolerances, it is necessry to ensure that even the smallest cassette is capable of this. A foam plastic strip 111, which compensates the tolerances and thrusts the cassette towards the drawer front wall, is therefore attached to the raised back plate 109 of the drawer 101.

FIGS. 21 to 23 show another embodiment. A signal knob 502 is movable at right angles to the drawer front wall 100 behind a lens 500 which is inserted into the front wall 100. The knob is mounted on a leaf spring 504 which is attached movably to the drawer base 110, is pretensioned towards the cassette accommodation region and carries a ramp wedge 506 by means of which the spring and hence the knob are pressed outwards when a cassette is inserted. FIG. 23 shows on a larger scale a section through the lens 500, which exhibits annular beads 508 in the manner of a Fresnel lens, which are each focussed on the surface of the knob in its full indication position (that is to say with a cassette inserted). The knob is therefore properly visible only in this position. The embodiment according to FIGS. 24 and 25 is similar: here a leaf spring 512 angled at 510 carries the signal knob 514. The arm 516 of the spring is deflected, similarly as in FIGS. 8/9, by an inserted cassette into the position shown in FIG. 24, whilst the rounded surface 518 of the knob 514 slides on the oblique surface 526 of the lens 528, the spring arm 520 being deflected into the position indicated by dashed lines in FIG. 25.

In all the embodiments so far described, the indicator device was a constituent solely of the drawer. In the embodiment according to FIGS. 26-30 the drawer front wall 100 again exhibits a perforation 104, behind which a signal flag etc. arranged on a spring appears when the box does not contain a cassette. To this extent there is similarity with FIGS. 8/9. Here however the spring is attached not to the drawer, but to the housing 160: it has an inner angled end piece 600 with claws 602 which is clamped between the top wall 162 and bottom wall 164 of the housing in front of its end wall 166.

There is room for the spring arm 604 beneath the region of an inserted cassette 107 beside the drawer guide rail, where the latter is thinner towards its head level part 113. A lateral prolongation 115 of the drawer rear wall 109 presses the spring arm 604 downwards when the drawer is protruded, so that the cassette can be inserted and removed without obstruction. When there is no cassette in the box, the arm 604 springs freely into the position according to FIG. 27, and its signal end 606 becomes visible behind the perforation 104. A variant embodiment is shown in FIG. 31. Here the helicoidally wound end 610 of a wire spring 612 is plugged onto a pin 608 at the end wall 166 of the housing, and in the relaxed state projects with a signal head 614 through a perforation 104 of the drawer front wall when the empty box is closed. When a cassette is inserted, the spring is deflected downwards by it similarly as in FIGS. 26-30. If the drawer is now pushed closed, its front wall strikes the signal head, which escapes inwards, the helicoidal spring formed by the end section 610 being compressed, because no buckling of the section 612 is possible due to the cassette resting upon it.

As already stated initially, FIGS. 32 and 33 relate to a box for video cassettes of one of the three current commercial formats ("Betamax", "2000", "VHS"). The cassette 715 rests by one of its narrow sides upon a drawer 700. The drawer is preferably movable by an ejector spring 701 out of a housing 703 into a removal position. A closure lid 702 is articulated with pivotal mobility to the drawer at 704, and opens when the cassette is transported out of the housing 703 by the drawer. According to the invention an indicator device 706, which has the structure described with reference to FIGS. 4 to 7, is attached to this lid. The only addition is a compensating spring 708 which can compensate the dimensional deviations between the cassette sizes "2000" "VHS". For the smallest cassette size ("Betamax") on the other hand it is preferred to provide a stop in the cassette box, possibly in the form of a pin 710 or the like inserted from the rear into the housing. It is to be understood that the other embodiments of indicator devices described are also adaptable to such boxes in corresponding manner.

The cbox boxes referred to initially are also supplied in a construction in which a transparent window is also provided in front of the drawer front wall, behind which a label can be inserted. The attachment of an indicator device similarly as described in FIGS. 4 to 7 is also possible in such a case. As FIGS. 34 to 36 show, a lenticular bulge 802 is then molded onto the transparent window pane 800, and the label 804 is perforated at 806 so that the signal head 140 can extend through and is visible within the label through the pane. The pane normally exhibits a non-reflecting finish, which is in that case not provided in the region of the bulge 802.

Lastly, FIGS. 37 to 39 show an embodiment in which the indication "empty" or "full" is given in that the drawer of the cbox box can be completely closed only when a cassette is inserted, but projects a few millimeters when it is empty.

The key 102 of the drawer normally has a single hook 180 molded on it, by which the drawer 101 when fully inserted is locked on an edge 182 of a perforation 184 provided in the housing base 164. Now, in the embodiment according to FIGS. 37 to 39 a second hook 900 is made behind the hook 180, so that the drawer 101 is also anchorable in a not quite fully inserted position (FIG. 38).

A stop, which is provided in the interior of the housing 160, admits the insertion of the drawer only as far as this position associated with the hook 900 when the cassette is removed, but is rendered inoperative when a cassette is inserted. This is achieved by a leaf spring 902 attached in the housing, on which spring a stop angle 904 is shaped, onto which the drawer rear wall 109 rides up unless an inserted cassette deforms the spring 902 and thus presses the hook 904 away out of the movement path of the drawer (FIG. 39).

In the embodiment according to FIGS. 34 to 36 the label can be inserted only if the element 802 is molded onto the front pane and the insertion slot for the label is accordingly unblocked in the case of an empty box. Alternatively, the label could also be provided with a slot at the relevant point, so that it passes the indicator element laterally. However, this is undesirable from aesthetic considerations. The variant illustrated in FIGS. 40 to 44 is rather preferred.

FIG. 40 shows in perspective the drawer of a cbox box in this variant form in an exploded view, FIG. 41 is a section made along the line 41—41 of FIG. 40, FIGS. 42 and 43 are corresponding sectional views, and FIG. 44 is a view similar to FIG. 43 in a somewhat variant construction.

In this embodiment the actual indicating system may correspond to the embodiment according to FIGS. 4 to 7, that is to say where the dome 118 permanently penetrates the space intended for the label. The label 1000 must therefore in any case exhibit a hole 1002 which fits over the collar 1004 of the dome 1006. To enable the label 1000 to be exchanged at all, the label window 1010 is connected articulately to the drawer front plate 1012. The label window is snapped by its journals 1014 into bearing grooves 1016 and is retained by lugs 1018; the grooves 1016 and the lugs 1018 define a "three-quarter bearing shell", so that it is then impossible for the window to fall out. The grooves 1016 are molded into a projecting edge 1020 of the front plate 1012, which is drawn round to the top edge of the front plate and interrupted by a handle orifice 1022. On both sides of the latter, depressions 1024 are constructed in this edge, which are of complementary construction to mandrels 1026 on the free end edge of the window 1010 and cooperate with the latter as a latch when the window is pressed in. The handle orifice 1022 permits the window to be gripped and hinged downwards with elastic yielding of the parts 1024/1026. An alternative locking system is shown in FIG. 44, where the window engages by an edge 1028 over the top edge of the drawer front plate and is locked there.

The actual window surface of the label window 1010 obviously lies in front of the accommodation plane of the label. The journals 1014 on the other hand are provided offset behind this plane, and the free space present behind the window extends to the front of the journals, so that the label can totally fill the space in front of the drawer front plate 1012 and need not be trimmed in the region of its lower corners in order to make space for the joint arrangement. This also permits a label to be inserted without much skill, because the label is automatically guided into the correct position when the window is hinged shut.

FIGS. 45 to 48 relate to a box for video cassettes with an indicating system according to the invention. This is a variant of the embodiment illustrated only schematically in FIGS. 32 and 33, whilst only the components relevant to the indicating system are illustrated.

Figure 45:
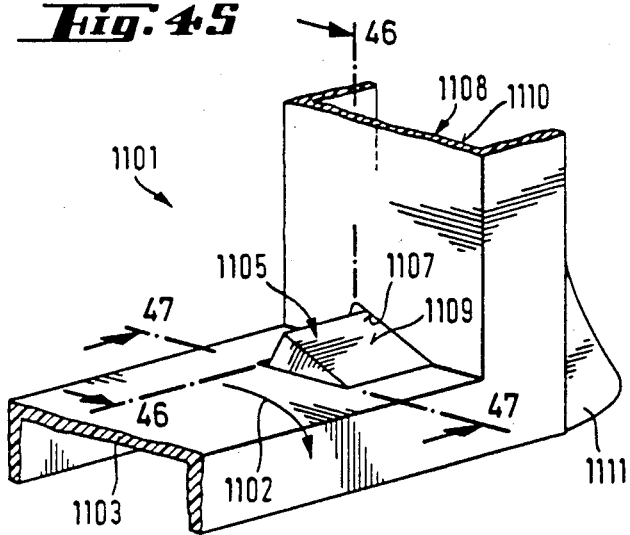
Figure 48:
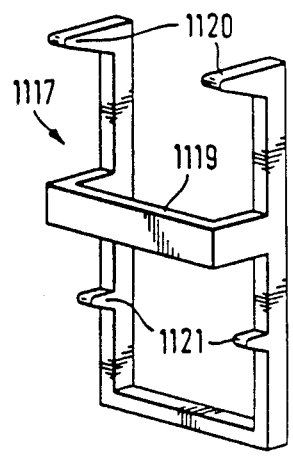
Figure 47:
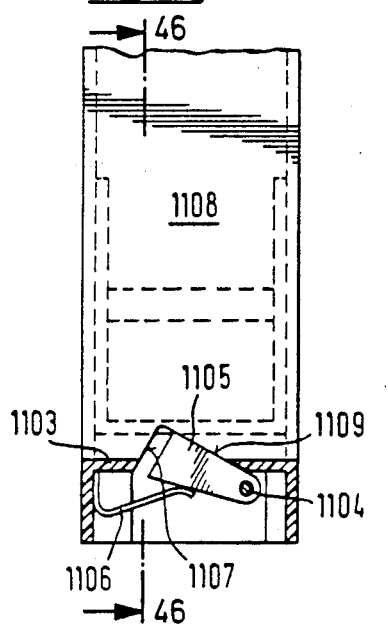
Figure 46:
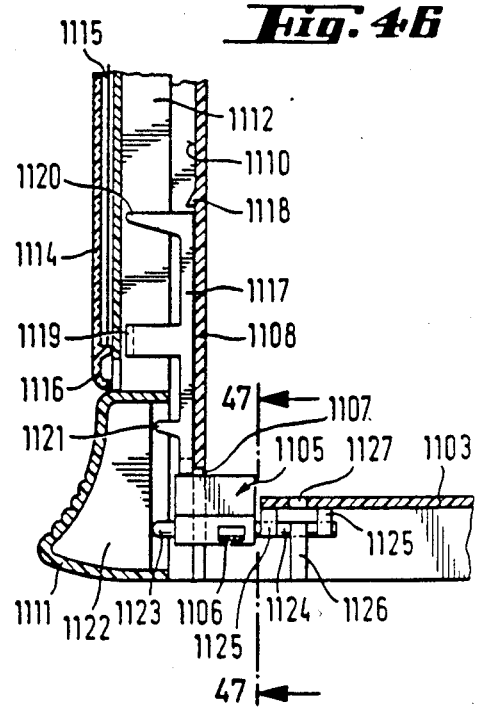

FIG. 45 shows the lower front region of the drawer lid 1101 viewed from inside, FIG. 46 is a section approximately in the plane 46—46, which is indicated in FIG. 45, FIG. 47 is a corresponding sectional view, and FIG. 48 shows in perspective one of the components used.

The drawer lid 1101 is pivoted in the direction of the arrow 1102 in order to close the box. A control lever 1105, which is mounted pivotably about a journal bearing 1104 in the base 1103 of the lid, is pressed by a soft leaf spring 1106 into the position shown in FIGS. 45 to 47, in which it stops in the recess 1107 of the lid strut 1108. When the box contains a video cassette, the wedge surface 1109 when pivoted in the direction of the arrow strikes the cassette edge and is deflected counter to the spring pretension.

A trigger key 1111 with a prolongation 1112 oriented parallel to the drawer strut 1108, guided slidably therein and exhibiting a U-shaped cross-section, the U members facing the strut, is present on that side of the wall 1110 of the strut 1108 remote from the box interior. A transparent window 1114 with a top label accommodation space 1115 and a bottom indicating window 1116 is present in front of the base of the U.

A rider 1117, which is illustrated in perspective in FIG. 48, is inserted into the space bounded by the U-shaped cross-section of the key prolongation. It is captive with sliding mobility between a top stop 1118 shaped on the drawer strut and the control lever 1105, upon which it "rides"; when the control lever is deflected downwards, as described, the rider 1117 follows by the effects of gravity and its signal strip 1119 becomes visible behind the indicating window 1116. The rider 1117 is guided loosely by means of its arms 1120 in the U-shaped cross-section of the key prolongation and by means of shorter arms 1121 on fins 1122 which are shaped internally on the key. That end 1123 of the journal 1124 of the control lever 1105 which is remote from the box interior is also braced against such a fin 1122. The bearing 1104 is formed by two bearing half shells 1125 shaped onto the base 1103 of the lid and a bottom bearing half shell 1126 which can be removed from the mold through a clear orifice 1127 if the parts are produced from injection molded plastics.

When the control lever 1105 is pressed downwards by the cassette, the rider 1117 follows by the effect of gravity. Its signal strip is then visible through the indicating window 1116. If it is desired not to rely upon gravity for the movement of the rider, due to the friction conditions or to be able to use the box also in a different position, the control lever may be constructed with two arms and the rider may be made to sit on the lever arm remote from the wedge surface and subjected to a downwardly directed spring pretension. In this case this spring not only maintains the rider permanently in abutment with the control lever, but also pretensions the latter into the empty indication position, so that no additional springis required for this purpose. In this case the signal strip naturally indicates that the box is empty, because the rider is not lowered, but raised when the control lever wedge surfaces rides up onto a cassette.

FIGS. 49 to 54 show an alternative embodiment of the indicating system according to the invention on the lid of a cassette box, the basic construction of which corresponds to FIGS. 32 and 33, so that only the essential parts are shown. FIG. 49 shows the elevation of a box for five video cassettes—the box according to FIGS. 45 to 48 could have the same appearance—, FIG.

50 is a sectional view similar to FIG. 46. FIG. 51 shows schematically the plan of the indicating system, FIG. 52 shows in elevation the key with the label window removed, and FIGS. 53 and 54 show two components of the system in perspective.

The box comprizes a housing 1200 with transport drawers for video cassettes, of which only the cover closing the housing orifice, with label window 1202 and trigger keys 1204 are visible in FIG. 49. An indicating panel is constructed in the foot region 1206 of the label window, as in the exemplary embodiment described previously, and FIG. 49 shows that this indicating panel is dark in the case of four of the five windows, whereas in the case of the remaining window it is light and therefore indicates that the relevant transport drawer does not contain a video cassette.

The sectional view according to FIG. 50 shows the key 1204 with its prolongation 1210 and with the attached label window 1212 and the vertical front wall 1214 of the lid. Two bearing half shells 1216 and a retaining journal 1218 are shaped onto this front wall, and the front wall also exhibits a perforation 1220.

The transverse journal 1222 of a lever (FIG. 53) 1224 is inserted with rotary mobility into the bearing half shells. This lever serves as a combined sensing and indicating element: its angle arm 1226 projects with a wedge section 1228 through the perforation 1220 and, when the lid is pivoted in the direction of the arrow 1230, rides up onto the edge 1232 of a video cassette 1233, whereby the lever 1224 is pivoted into the indicating position illustrated by solid lines in FIG. 50. A leaf spring 1234 exerts a torque upon the angle arm 1226 and thereby pretensions it into the "sensing" position indicated by dashed lines in FIG. 50. When the lever is pivoted by the cassette, its signal arm 1236 appears in the bottom region 1206, which is thereby darkened (FIG. 49). The leaf spring 1234 is part of a bent stamping 1238 (FIG. 54) which also exhibits, in addition to the spring 1234, two likewise resilient retaining arms 1240 which retain the transverse journal 1222 in its bearing shells. A polygonal hole 1242 in the bent stamping 1238 is pushed over the retaining journal 1218 and catches there by means of a cut tab 1244.

We claim:

1. A storing device for storing flat recording media carriers, such as magnetic tape cassettes, comprising:
a housing adapted to receive at least one media carrier, and having a front wall,
said front wall having at least one opening permitting movement of a media carrier between a first inserted position in said housing and a second exposed position permitting removal of the media carrier from said housing,
a transport means for moving a media carrier between said first inserted position and said second exposed position,
said transport means having a media carrier supporting part and a front part exhibiting a surface configured to cover at least partially said opening so as to form part of said front wall when said media carrier supporting part is in said housing,
an indicating means for indicating, when said transport means is in said housing, whether a media carrier is contained therein,
said indicating means comprising a sensing portion adapted to sense the presence of a media carrier and extending, in a first position, into a space defined by said housing to be occupied by the media carrier, and being displaced into a second position when the media carrier is in said inserted position,
said indicating means further comprising a signal flag portion operatively connected to said sensing portion for being displaced between a first position indicating the absence of a media carrier in said housing and a second position indicating the presence of a media carrier in said housing, said signal flag portion being visible in a predetermined area of said front wall in at least one of its said first and second positions, and a displacing means for displacing said sensing portion into its said first position without a media carrier in said inserted position thereof,
at least one of said indicating means portions being mounted in said housing, and
said transport means having apertures through which said indicating means sensing portion is displaced between its said first and second positions.

2. The device of claim 1 wherein,
said housing has a plurality of compartments and separate indicating means for each said compartment.

3. The device of claim 1 wherein,
said transport means comprises a drawer.

4. The device of claim 3 wherein,
said front part comprises a drawer front wall

5. The device of claim 3 wherein,
said drawer comprises a flat media carrier supporting bottom.

6. The device of claim 5 further comprising,
a plurality of media carrier receiving compartments positioned in said housing, and
each said compartment having a bottom wall and drawer guide means on said bottom wall for guiding said drawer.

7. The device of claim 3 further comprising,
a plurality of media carrier receiving compartments positioned in said housing, and
each said compartment having side walls and drawer guide means on said side walls for guiding said drawer.

8. The device of claim 1 further comprising,
a drive spring operatively connected between said transport means and said housing so as to bias said transport means into said second position.

9. The device of claim 8 further comprising,
a locking means for locking said transport means in said first position against the bias of said drive spring, and
said locking means being manually unlockable.

10. The device of claim 9 wherein,
said locking means includes an unlocking actuator disposed at said front wall.

11. The device of claim 6 wherein,
said unlocking actuator comprises a key.

12. The device of claim 11 wherein,
said predetermined front wall area is defined by a window, and
said window is disposed adjacent to said key.

13. The device of claim 1 wherein,
said flag portion is pivotable between said first and said second indicator positions about an axis.

14. The device of claim 1 further comprising,
an urging means for insuring proper contact between said media carrier and said sensing portion in spite of tolerances.

15. The device of claim 1 wherein, said front wall is of a first color and said flag portion has a second color contrasting with said first color.

16. The device of claim 1 wherein,
said sensing portion and said flag portion are integral parts of a spring.

17. The device of claim 1 further comprising,
a plurality of compartments, each adapted to receive and support separate media carriers, positioned in said housing.

18. The device of claim 17 wherein,
said front wall has a front wall opening for each said compartment, and
said surface covers said front wall openings when the media carriers are in said first position.

19. The device of claim 17 wherein,
each said compartment has a compartment wall, and
said transport means comprises a media carrier supporting drawer and drawer guide means secured to said compartment wall for guiding said drawer.

20. The device of claim 17 wherein,
said indicating means is mounted in said compartment.

21. The device of claim 1 wherein,
said predetermined front wall area is defined by a window, and
said signal flag portion is visible through said window.

22. The device of claim 21 further comprising,
a drive spring means for biasing said transport means into said second position,
a locking means for locking said transport means in said housing against the bias of said drive spring means, and
said locking means including a manual unlocking actuator disposed at said front wall adjacent to said window.

23. The device of claim 21 wherein,
said flag portion and said sensing portion form an integrally molded member.

24. The device of claim 1 wherein,
said window is positioned in said transport means front part surface.

25. The device of claim 24 wherein,
said window comprises a transparent cover.

26. The device of claim 25 wherein,
said cover has a portion protruding beyond said front part surface permitting sideward recognition of said indicating means.

27. The device of claim 21 wherein,
said indicating means comprises a spring member having a first end connected to said housing and a second end adapted to be deflected by a media carrier when the media carrier is moved into said housing by said transport means, and
said spring member being positioned so that the deflection or non-deflection condition thereof is visible through said window.

28. The device of claim 27 wherein,
said spring member carries said signal flag portion visible in said area only when said spring member is in its non-deflected condition.

29. The device of claim 27 wherein,
said spring member is a leaf spring.

30. The device of claim 27 wherein,
said spring member is a helical spring adapted to be compressingly deflected.

31. The device of claim 1 wherein,
said sensing portion displacing means includes bias spring means.

32. The device of claim 31 wherein,
said bias spring means comprises a metallic spring.

33. The device of claim 1 wherein,
said transport means has at least one aperture in the media carrier supporting part thereof.

* * * * *

UNITED STATES PATENT AND TRADEMARK OFFICE
CERTIFICATE OF CORRECTION

PATENT NO. : 4,743,077
DATED : May 10, 1988
INVENTOR(S) : Peter Ackeret

It is certified that error appears in the above-identified patent and that said Letters Patent is hereby corrected as shown below:

On the title page inventor should read

--(75) Inventor: Peter Ackeret,
                Kusnacht, Switzerland--.

Signed and Sealed this

Ninth Day of October, 1990

*Attest:*

HARRY F. MANBECK, JR.

*Attesting Officer*     *Commissioner of Patents and Trademarks*